United States Patent
Wood (12)

(10) Patent No.: US 6,968,051 B1
(45) Date of Patent: Nov. 22, 2005

(54) PROGRAMMABLE FEATURE QUEUES

(75) Inventor: Patrick S. Wood, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 800 days.

(21) Appl. No.: 09/723,587

(22) Filed: Nov. 28, 2000

(51) Int. Cl.[7] .............................................. H04M 3/42
(52) U.S. Cl. .......................... 379/201.01; 379/211.02; 379/215.01
(58) Field of Search ...................... 379/201.01, 211.02, 379/215.01

(56) References Cited

U.S. PATENT DOCUMENTS

| | | | | |
|---|---|---|---|---|
| 5,329,578 A | * | 7/1994 | Brennan et al. | 379/211.03 |
| 5,436,957 A | * | 7/1995 | McConnell | 379/88.23 |
| 5,636,269 A | | 6/1997 | Eisdorfer | 379/215.01 |
| 5,661,790 A | | 8/1997 | Hsu | 379/209.01 |

* cited by examiner

*Primary Examiner*—Ahmad F. Matar
*Assistant Examiner*—Karen Le
(74) *Attorney, Agent, or Firm*—Withrow & Terranova, PL

(57) ABSTRACT

The present invention provides for modification of call features and the priority to initiate these call features on an overall office, group, or subscriber level. In essence, configurable feature queues may be created and associated with any number of subscribers or groups of subscribers in a call processing environment. Preferably, a standard feature queue is provided for an office. The call features and the sequence in which the call features are implemented are modifiable within the standard feature queue for the entire office. Additional feature queues for identified groups of subscribers may be created and modified as desired to provide a unique feature queue for that particular group. Similarly, feature queues may be created and modified for individual subscribers. As such, the present invention provides for customized feature queues on a per-office, per-group, or per-subscriber level.

20 Claims, 6 Drawing Sheets

| CALL EVENT | OFFICE (DEFAULT) | OFFICE (MODIFIED) | GROUP WITHIN OFFICE | SUBSCRIBER WITHIN OFFICE OR GROUP |
|---|---|---|---|---|
| EVENT 1 | FEATURE 1<br>FEATURE 2<br>FEATURE 3<br>FEATURE 4 | FEATURE 2<br>FEATURE 1<br>FEATURE 3<br>NO PROVISIONING FOR FEATURE 4 | FEATURE 3<br>FEATURE 2<br>FEATURE 1 | FEATURE 1<br>FEATURE 2<br>FEATURE 3 |
| EVENT 2 | FEATURE 5<br>FEATURE 6<br>FEATURE 7<br>FEATURE 8<br>... | FEATURE 5<br>FEATURE 6<br>FEATURE 7<br>FEATURE 8<br>... | FEATURE 6<br>FEATURE 7<br>FEATURE 8<br>FEATURE 5<br>... | FEATURE 7<br>FEATURE 6<br>FEATURE 5<br>FEATURE 8<br>... |
| ... | | | | |

*FIG. 3*

PROGRAMMABLE FEATURE QUEUES

FIELD OF THE INVENTION

The present invention generally relates to call processing, and in particular, relates to providing custom events and feature initiation sequences during call processing.

BACKGROUND OF THE INVENTION

With the advent of intelligent networks, the number of calling features, such as "call waiting" and "call forward busy," have greatly increased. These features are triggered based on a defined event during a telephony call. Since multiple features may be available for a given event, the order in which these features are initiated is defined in a feature queue. Thus, when the trigger event occurs, the entity providing call processing will attempt to initiate the features in the feature queue in a sequential fashion.

Typically, the events, features, and order of the features in the feature queues are set for an entire switching center, such as a central office or mobile switching center. In addition, both the telephony equipment manufacturers and the service providers are typically constrained by the event and feature policies established by standards entities, such as Bellcore. At the present, these entities define the events that trigger features and the order in which these features are initiated for a given event. When customers of the equipment manufacturers want to modify the event and feature policies dictated by the standards entity, the equipment manufacturer, customer, and standards entity must get together and negotiate any changes in the policies, because the equipment manufacturers cannot unilaterally change the policies. Although the customers could theoretically change their individual event and feature policies, there is not way to facilitate the modification of events and features at a per-office level. As such, there is a need for a way to modify call processing events and feature initiation sequences on a per-office basis.

Further, many subscribers and groups of subscribers may not subscribe to the services associated with the call features. For example, many subscribers and groups thereof do not subscribe to call waiting and an even greater number typically do not subscribe to call forward busy services. Unfortunately, the rigid structure of the current call processing architecture attempts to initiate each of these features, even if the subscriber or group thereof does not subscribe to the service associated with the feature. Given the numerous events and potential features for each of these events, a significant amount of processing time and power is wasted attempting to initiate features that are not relevant to the given call. As such, there is a need for a way to eliminate unnecessary attempts to initiate call features that are not available for a subscriber, group of subscribers, or office.

A further failing of the existing call processing architecture is the inability to change the order of initiation of features for a given event. For example, if a subscriber or group of subscribers subscribe to call waiting and call forward busy services, many of the subscribers may want to have the call waiting service initiated prior to call forward busy whereas others would rather the call forward busy service initiate prior to call waiting. Similar decisions may be desired for an entire office. Regardless of whether it is the entire office, a group or subscribers, or an individual subscriber, there is a need to provide an efficient way to select the order in which features are initiated for a given event in addition to defining features for a given event.

SUMMARY OF THE INVENTION

The present invention provides for modification of call features and the priority to initiate these call features on an overall office, group, or subscriber level. In essence, configurable feature queues may be created and associated with any number of subscribers or groups of subscribers in a call processing environment. Preferably, a standard feature queue is provided for an office. The call features and the sequence in which the call features are implemented are modifiable within the standard feature queue for the entire office. Additional feature queues for identified groups of subscribers may be created and modified as desired to provide a unique feature queue for that particular group. Similarly, feature queues may be created and modified for individual subscribers. As such, the present invention provides for customized feature queues on a per-office, per-group, or per-subscriber level.

When creating unique feature queues for the various groups of subscribers and individual subscribers, the group subscriber may initially inherit the standard feature queue for the office and then modify the feature queue as desired. Similarly, an individual subscriber may inherit the standard feature queue for the office, and preferably, when in a defined group of subscribers, inherit the feature queue for the group. The feature queues may be associated with the entity providing call processing or may be provided in a remote database accessible by the entity providing the call processing.

In operation, the call processing entity will receive a trigger indicating a call processing event has occurred. The entity will identify the associated feature queue for the subscriber, group, or office, and provide call processing according to the call features defined in the chosen feature queue. Preferably, a feature queue for the lowest level entity is chosen. For example, if a subscriber has a defined feature queue and the subscriber falls within a group of subscribers having a feature queue, the individual subscriber feature queue will take precedence over the group's feature queue. Similarly, a group's feature queue will take precedence over the standard office feature queue.

Call processing may take place in any number or combination of nodes in a variety of telephony networks. The call processing techniques of the present invention are equally applicable to traditional circuit-switched telephony systems, such as the public switched telephone network and wireless telephony networks. Further, the invention is beneficial in packet-switched telephony networks, such as those used to carry voice, or in asynchronous transfer mode-based network. The call processing activities may be provided by a central call processing unit or call server, or may be distributed or provided by virtually any entity, from the telephony endpoint to a centralized call processing node.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of the specification illustrate several aspects of the present invention, and together with the description serve to explain the principles of the invention.

FIG. 3 is a table outlining an exemplary event table having modified feature queues.

DETAILED DESCRIPTION OF THE PREFERRED EMBODIMENTS

The present invention provides for associating call processing events, the features associated with those events, and the order in which those features are initiated, on a per-office, per-group, and/or per-subscriber basis. Upon reading the following description in light of the accompanying drawing figures, those skilled in the art will understand the concepts of the invention and will recognize applications of these concepts not particularly addressed herein. It should be understood that these concepts and applications fall within the scope of this disclosure and the accompanying claims. The embodiments set forth below represent the necessary information to enable those skilled in the art to practice the invention and illustrate the best mode of practicing the invention.

Figure 1:
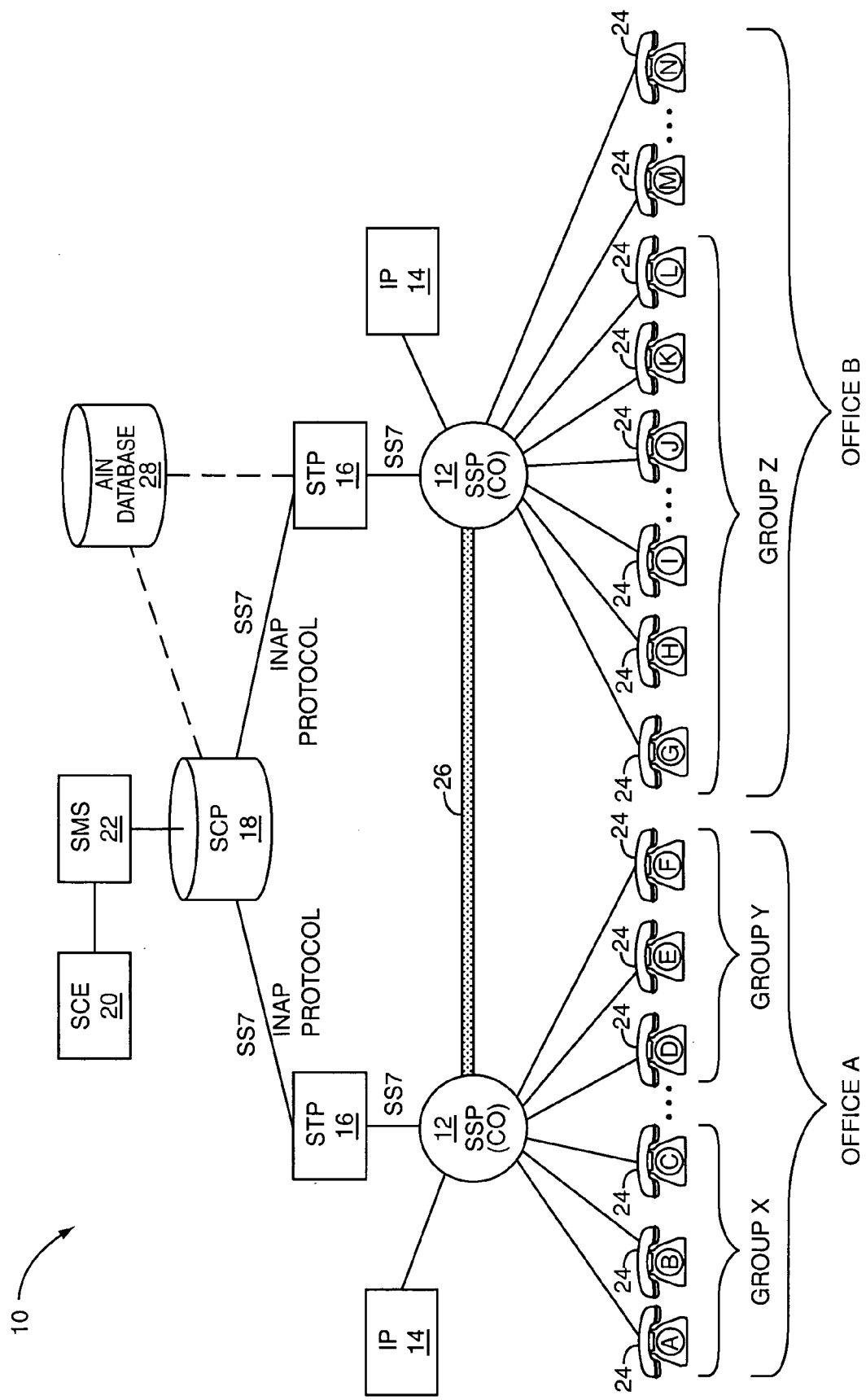
FIG. 1 is a block representation of an intelligent network configured to facilitate one embodiment of the present invention.

With reference to FIG. 1, an intelligent network system 10 is illustrated. The intelligent network system 10 includes various points, or nodes, capable of communicating with one another over packet-switched networks. Each of these nodes represents a hardware or software entity that may be located virtually anywhere and addressed from anywhere throughout the network. Further, these points may be facilitated at remote locations or may be combined or integrated in virtually any fashion. These points are shown isolated from each other to facilitate an understanding of the functionality associated with each point.

Traditionally, intelligent network components include a service switching point (SSP) 12, an intelligent peripheral (IP) 14 closely associated with the SSP 12, a signal transfer point (STP) 16 and a service control point (SCP) 18 that cooperate to facilitate the establishment of calls and conduct the call processing associated therewith. The intelligent network system 10 will also typically include a service creation environment (SCE) 20 and a service management system (SMS) 22 that cooperate to facilitate overall management, administration and maintenance of the intelligent network system 10.

The SSP 12 typically includes a hardware switch in association with software to facilitate basic call control and the added functionality to support intelligent network services and features. Preferably, the SSP 12 is configured to separate basic calls from intelligent network-based calls as they arrive at the switch. The intelligent network-based calls are associated with events and features triggered upon the occurrence of these events. When handling an intelligent network-based call, the SSP 12 will temporarily suspend basic call processing and interact with the SCP 18 via the STP 16 using Signaling System Number 7 (SS7) signaling protocol to determine how to process the call based on the identified event.

The SSP 12 may be a central office exchange, local exchange, private branch exchange (PBX) or the like, capable of handling circuit-switched communications with any number of subscribers via telephony devices 24. To facilitate communications, the SSPs 12 carry voice traffic between one another over telephony lines or trunks 26 to facilitate the various connections between the telephony devices 24.

The STP 16 is typically a very reliable packet switch that provides for concentration of signaling for a large number of trunks 26 and handles the routing of signaling messages between the SSPs 12 and SCPs 18. Further, the STP 16 may facilitate translation of a virtual destination to a physical destination as well as provide security screening. STPs 16 are not necessary for intelligent network systems and may be co-resident in the SSP 12.

The SCP 18 facilitates call processing, and usually includes a real-time database that stores subscriber records. When accessed during an intelligent network-based call from the SSP 12, the SCP 18 executes logic for call processing. In the present invention, the SCP 18 will typically receive a call processing inquiry from the SSP 12 upon the occurrence of an event during a call and send instructions back to the SSP 12 on how to process the call.

The IP 14 is typically a stand-alone processor that is tightly coupled to the SSP 12 to provide additional functionality for the SSP 12. The additional functionality may include providing recorded announcements, facilitating an interactive voice response capability, translating dual tone multi-frequency (DTMF) signals, recognizing speech, managing facsimiles, and providing access to additional signaling networks.

The SCE 20 typically provides an interface to the intelligent network system 10 and facilitates development, debugging and provisioning of new services for the intelligent network system 10. The SMS 22 provides for loading, administration, and maintenance of data and provides an interface to the SCP 18. This interface allows management to create, update, and validate number translation and call charge tables as well as download information from and control logic of the SCP 18.

As noted the SSP 12 is typically a switch that operates to recognize service requests, request call handling instructions from an SCP 18, and execute those instructions to complete a call. The SSP 12 looks for embedded "triggers" associated with events, which require the SSP 12 to initiate an intelligent network service by sending a query to the SCP 18. As described below, the event triggering call processing by the SCP 18 is typically associated with one or more features associated with call services. The SSP 12 also formulates and transmits requests to the SCP 18 and processes replies and requests from the SCP 18. The SSP 12 creates intelligent network announcements formulated by the service provider, typically in association with the IP 14, and transmits event messages to the SCP 18.

The SCP 18 typically receives requests from the SSP 12 and determines the destination telephone number for the call. The SCP 18 receives and processes event messages from the SSP 12, and formulates and sends responses to the SSP 12. The SCP 18 processes accounting and statistical information, such as the number of the calling party, the dialed intelligent network number, duration or type of ringing tone or call waiting signal, and other such call parameters. The SCP 18 interfaces with and receives commands for controlling services and service features of the SMS 22.

Events occurring during a call will trigger corresponding aspects of call processing. Triggering is generally defined as the process by which the SSP 12 determines that a query requesting call processing instructions will be sent to the SCP 18. A trigger is an occurrence of an event and the satisfaction of certain conditions, which results in a message being sent to the SCP 18. Triggers can be originating triggers, mid-call triggers, or terminating triggers. Examples of originating triggers are off-hook immediate and off-hook delay triggers, and custom dialing plan triggers. An example of a mid-call trigger is "flash." An example of a terminating-call trigger is the "busy condition" received when attempting to terminate a call. Another example of a terminating trigger is the "ring-no answer" condition. Call waiting and call forward busy are two widely used call triggers for busy conditions. Importantly, the previous definitions are specific to advanced intelligent networks. Generically, triggers define a place at which an application may choose to alter or react to the event associated with the trigger.

Traditionally, the events triggering call features are static for a given office or exchange. In the case of a busy condition, a static feature queue is provided whereupon the occurrence of a busy condition, call processing will automatically attempt to initiate the call waiting service, and if the call waiting service is not satisfied, attempt to initiate a call forward busy service. The latter service allows the call to be forwarded to another number defined by the called party.

For a traditional system, call processing is handled as follows. Assume for the purposes illustrated that a called party using telephony device 24M is busy on a call and that there is an incoming call to telephony device 24M from another telephony device 24A. The call between telephony device 24A and telephony device 24M extends from the telephony device 24A to the associated SSP 12, and is routed to the SSP 12 associated with the telephony device 24M and on to the telephony device 24M. When the local SSP 12 attempts to route the call to the telephony device 24M, the originating SSP 12 will detect that the telephony device 24M is busy on another call, which recognizes the busy condition event.

Upon recognition of the busy condition event, the SSP 12 queries the SCP 18 for call processing instructions, if applicable. If, for example no IN service was provisioned, no query would occur. The SCP 18 receives the query, typically in association with the destination telephone number (i.e. the telephone number for telephony device 24M), and accesses a database for call processing instructions in the event of a busy condition. Assuming the static feature queue for the busy condition event requires initiation of a call waiting service followed by the initiation of a call forward busy service, if the call waiting service is not accepted, call processing will be provided accordingly. For call waiting, the SCP 18 will instruct the switch to provide the call waiting tone for a select number of times, and if the called party does not respond to the call waiting signal, the SSP 12 will again query the SCP 18 for additional call processing instructions. As such, the SCP 18 will send instructions to the SSP 12 to facilitate the call forward busy service as defined in the feature queue for the busy condition event.

Although the above example is fairly simplistic, those skilled in the art will recognize the static nature of feature processing upon the occurrence of events throughout call processing. As outlined in FIG. 2, the present invention allows for modifying the traditional feature queues associated with an event, and optionally, allows individual subscribers or groups of subscribers to modify and define their own feature queues for events.

Although the preferred embodiment of the invention facilitates call processing in the SCP 18, the inventive call processing techniques provided by the present invention may be incorporated in virtually any node or point in a telephony system, including any telephony devices capable of handling call processing. Further, call processing may be shared amongst various points, as those skilled in the art will recognize.

Initially, a default set of events with associated feature queues are received (block 100) by the call processing system. This default set of events and feature queues may be governed by standards organization, such as Bellcore. With the present invention, modification of the events and the associated features may be modified on a per-office basis. As such, management of the office will define the events and the features provided by that office (block 110). Accordingly, a feature queue is created for each event (block 120). The feature queue defines the order to initiate features upon occurrence of the event for the entire office.

Figure 2:
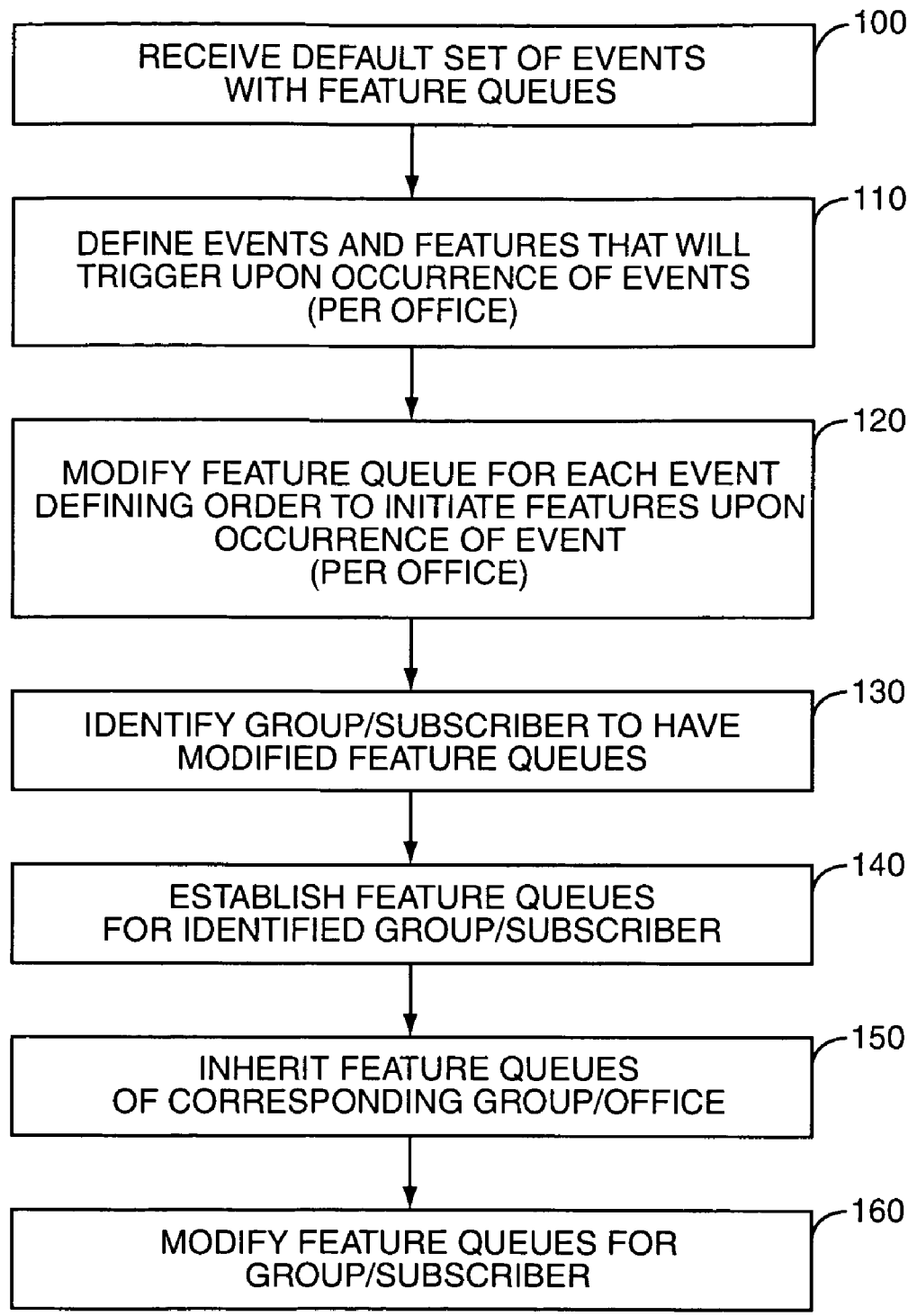
FIG. 2 is a flow diagram outlining the initial setup of events and associated features for an office, group of subscribers, and/or individual subscriber.

The table in FIG. 3 provides an exemplary call processing event and feature table identifying two events (EVENT 1 and EVENT 2). The default features in the feature queue for EVENT 1 include FEATURES 1 through 4, while the features in the feature queue for EVENT 2 are FEATURES 5 through 8. According to the default settings, upon the occurrence of EVENT 1, FEATURES 1 through 4 will be initiated in order, assuming FEATURES 1 through 3 are not successfully deployed in a fashion satisfying a response to the event. Similarly, FEATURES 5 through 8 are initiated in order upon the occurrence of EVENT 2. At this point, the present invention allows modification of the feature queue for each event for the entire office (FIG. 2, block 120). Referring again to FIG. 3, the feature queue associated with EVENT 1 for the office is modified such that FEATURE 4 is not provided, and the features will initiate in the following order: FEATURE 2, FEATURE 1, and FEATURE 3. The feature queue for EVENT 2 is depicted as remaining the same as the default for the office.

If desired, various groups within an office may be defined and associated with a custom feature queue. Further, custom features queues for individual subscribers may be provided. Depending on whether a group or individual subscriber queue is necessary, the members of the group or the individual subscriber is identified (FIG. 2, block 130), and feature queues are established for the identified group or individual subscriber (block 140).

With reference to FIG. 1, all of the subscribers for office A are either associated with group X or group Y. In contrast, subscribers G through L are associated with group Z, wherein subscribers M and N are not part of a group. In this example, groups X, Y and Z may have unique, customized feature queues for the various events that may occur throughout call processing. Similarly, subscribers M and N may have further unique, customized feature queues for the various events supported by the offices A and B.

As shown in the table of FIG. 3, the defined groups X, Y, and Z and subscribers M and N will preferably, automatically inherit the default feature queues of the associated group or office (FIG. 2, block 150). As shown in FIG. 3, one of the groups within the office may rearrange the order of features in the feature queue, which was previously modified by the office.

The group identified in the table of FIG. 3 will have a feature queue defining initiation of FEATURE 3, FEATURE 2, and then FEATURE 1 upon the occurrence of EVENT 1. Since the office does not support FEATURE 4 for EVENT 1, the group will not support the feature or provide the feature in the feature queue. For EVENT 2, the features in the feature queue for the group have been modified from that of the office wherein the features are triggered in the following order: FEATURE 6, FEATURE 7, FEATURE 8 and FEATURE 5.

Similarly, subscribers within the group may further modify their feature queues (FIG. 2, Block 160). For the subscribers identified in FIG. 3, the feature queue for EVENT 1 carries out the features in the following order: FEATURE 1, FEATURE 2 and FEATURE 3. The feature queue for EVENT 2 for the identified subscriber provides the following order: FEATURE 7, FEATURE 6, FEATURE 5 and FEATURE 8 for EVENT 2.

Accordingly, events, features, and the order in which the features are listed in the feature queue may be modified on an office, group or subscriber level. Subscribers within a group, as well as subscribers not associated with the group, may modify these features. Further, subscribers within a group may have different features than other subscribers within a group, but preferably, the office must provide the service associated with the feature to support the use of the feature for an entire group of subscribers or for an individual subscriber.

Once the feature queues are established for a subscriber, group and/or office, call processing is facilitated accordingly. Preferably, feature queues associated with a subscriber take precedence, and if there is not a feature queue associated with a subscriber for an event, the feature queue for a group is used. If a feature queue for a group is not available, the feature queue for the office is used.

Figure 4:
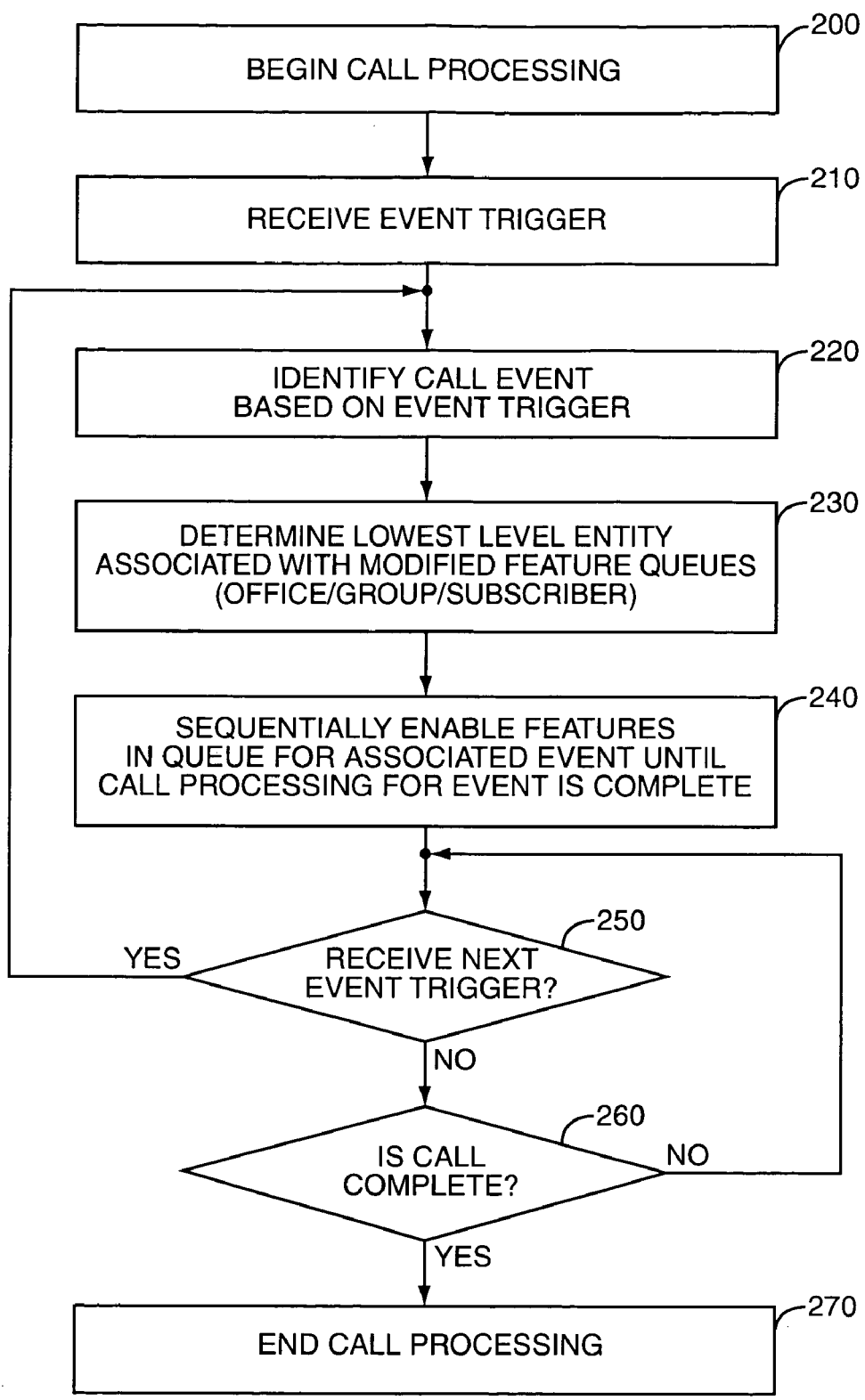
FIG. 4 is a flow diagram outlining basic call processing using the modified event table and feature queues.

FIG. 4 outlines the basic flow of call processing according to the present invention wherein call processing begins (block 200). When the call processing system receives an event trigger (block 210), the event is identified based on the event trigger (block 220). As noted, the lowest level entity associated with a modified feature queue is identified (block 230). Preferably, the call processing system will determine if the subscriber has been assigned a feature queue for the event. The call processing system will look to the subscriber, then the group and finally the office for an event queue for the event. Once the event queue is identified, call processing will sequentially enable the features in the queue for the associated event until the call processing for the event is complete (block 240). For example, if the event is a busy condition and the associated feature queue lists call waiting first and call forward busy second, call processing will attempt to initiate call waiting, and if the call waiting initiation attempt fails, for whatever reason, a call forward busy attempt is initiated.

Once the call processing for the event is complete, the call processing system will determine if the next event trigger has been received (block 250). If the next event trigger is received, the process will preferably repeat by identifying the event (block 220), determining the lowest level entity associated with the feature queue (block 230), and enabling the features in the queue until the call processing is complete (block 240). If the next event triggered is not received (block 250), the system will determine if the call is complete (block 260). If the call is not complete, the system will continue to monitor for the next event trigger (block 250). If the call is complete, processing will end (270).

Those skilled in the art will recognize that call processing capabilities may be incorporated in various ones of the points in the intelligent network 10, and may be shared between multiple points therein. Further, the present invention is equally applicable to various telephony systems providing call processing to facilitate call features. As the processing capabilities in telephony networks move closer to the endpoints; telephony switches, peripherals, and the telephony devices themselves may be configured to carry out call processing. In the latter case, the telephony device 24 will represent a point in the communication system capable of providing call processing.

A further modification of the present invention is to allow the features associated with an event to be determined from multiple queues. For example, in an advanced intelligent network structure, an advanced intelligent network database 28 (FIG. 1) may provide additional feature processing or identify additional features for an event. The features associated with the advanced intelligent network database 28 may be used instead of or combined with the call processing features associated with the database used by the SCP 18. In essence, the feature queue may include queues from multiple databases to identify features to initiate based on a given event.

The ability to associate feature queues for events with subscriber groups and individual subscribers is equally applicable to packet-switched telephony wherein features are associated with telephony calls facilitated over packet-switched networks, such as used in voice-over IP. Similarly, call processing for mobile or wireless communication systems may be equally controlled on a subscriber, group or office level.

Importantly, the databases storing the feature queues and associated events may be incorporated within the node providing the call processing, or may be remote therefrom. For example, the SSP 12 may provide a database accessible by the SCP 18 for storing feature codes for the various subscribers, groups, or the entire office. Although the processing and database allocation may be quite varied, it is preferably to place the database and the overall call processing in the SCP 18, or like call server for the communication system.

Figure 5:
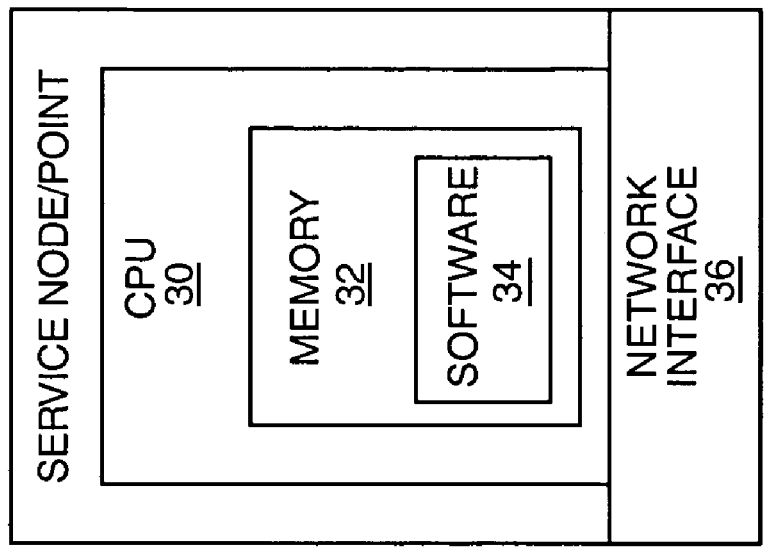
FIG. 5 is a block representation of a service node.

Outside of the switch or SSP 12, most of the call processing points in a communication server are configured to communicate over a packet-switched network and do not require the ability to actually transport voice traffic in a packet- or circuit-switched form. As such, a basic service node or point, as shown in FIG. 5, will include a central processing unit (CPU) 30, having sufficient memory 32 to store the requisite software 34 for operating the service node or point. Further, the memory 32 may include a database storing the events and associated feature queues. As noted above, the database is preferably associated with the service node or point providing the actual call processing, but may be associated with other elements in the system. Additionally, the service node or point may include a network interface 36 to facilitate communications with other service nodes or points in the system.

Figure 6:
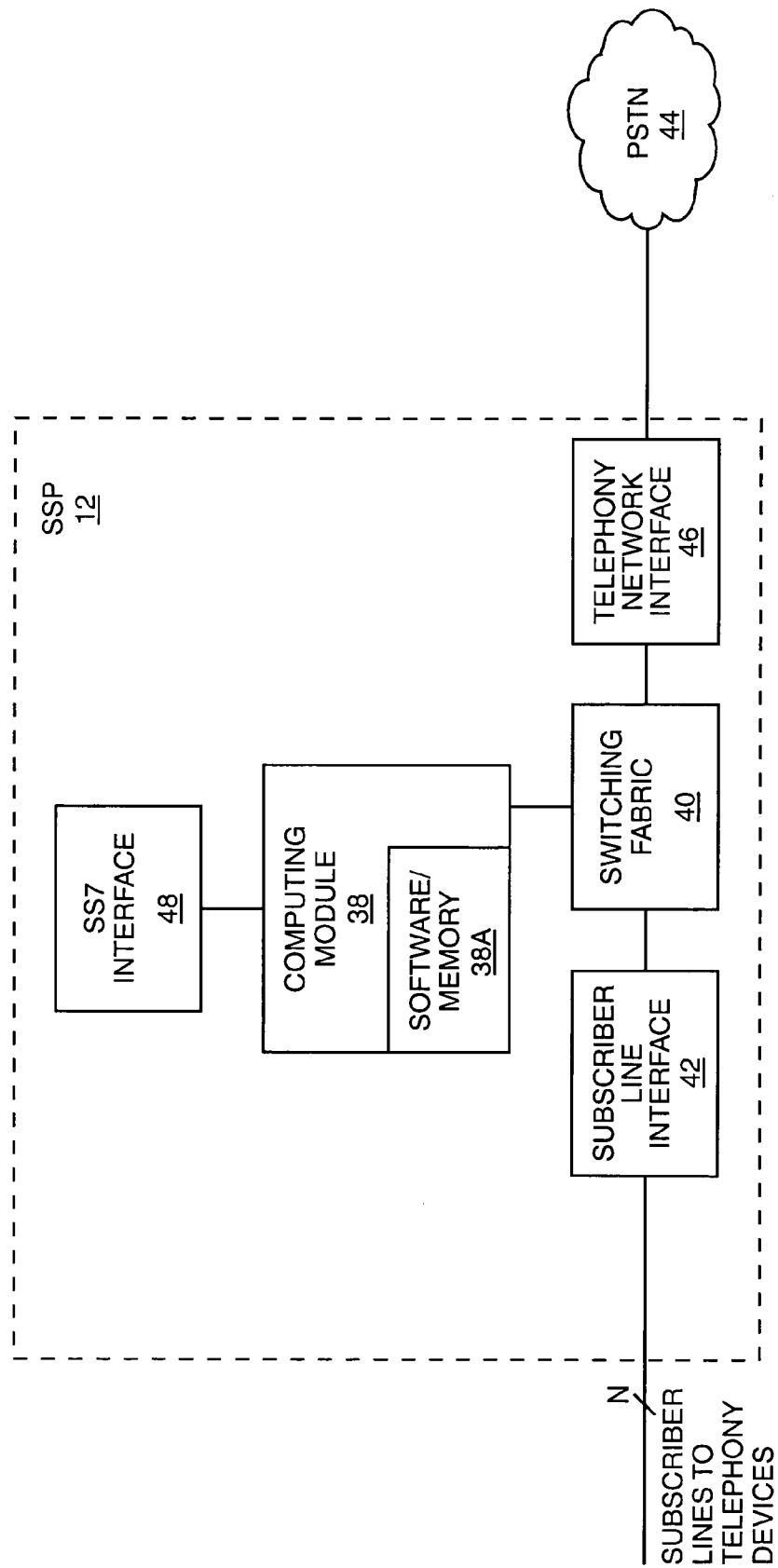
FIG. 6 is a block representation of a switching node.

If the service node or point is a switch or includes switching ability, an architecture similar to that shown in FIG. 6 may be provided. FIG. 6 is a block representation of an SSP 12, configured as a local exchange switch. The depicted architecture illustrates the simplified representation of a DMS-100 local exchange switch, which is manufactured by Nortel Networks Limited.

A typical DMS-100 implementation includes a computing module 38 having the requisite software and memory 38A for operation. A "switching fabric" module 40 provides a circuit-switched interface between a plurality of subscriber lines via a subscriber line interface 42 and the public switched telephone network (PSTN) 44 via the telephony network interface 46. For implementation in an intelligent network system 10, the SSP 12 will preferably include an SS7 interface 48 operatively associated with the computing module 38.

Those skilled in the art will recognize the numerous benefits provided by the present invention and the numerous techniques to provide the inventive call processing techniques in a variety of telephony systems. These benefits include eliminating the need for the nodes carrying out call processing to attempt to initiate a feature when the feature is in a feature queue, but not provisioned by the office or subscribed to by the group or subscriber. In essence, call processing time is not wasted trying to figure out that a feature in the default feature queue is not applicable. Call servers or like call processing systems may be provisioned according to standardized specifications while allowing customers the opportunity to modify policy provisions after the sale. Further, these policies may be further modified for various groups and subscribers supported within the overall system. Those skilled in the art will recognize further modifications and improvements of the present invention. All such modifications and improvements are considered within the teachings herein and the claims that follow.

What is claimed is:

1. A method of facilitating customized call processing comprising:
    defining a plurality of entities, each of said plurality of entities selected from the list consisting of: an office, a group, or a subscriber;
    creating an office feature queue for at least one office entity, wherein the office feature queue defines a sequence of call features and an associated event for call processing;
    defining a sequence with which to implement call features for the office feature queue;
    creating a group feature queue for at least one group entity associated with the at least one office entity, wherein the group feature queue is based on an inherited corresponding office feature queue;
    allowing modification of the group feature queue to customize the group feature queue;
    creating a subscriber feature queue for at least one subscriber entity associated with the at least one group entity, wherein the subscriber feature queue is based on an inherited corresponding group feature queue;
    allowing modification of the subscriber feature queue to customize the subscriber feature queue;
    receiving a trigger indicating an occurrence of the event for a call associated with the at least one office entity;
    identifying the office feature queue associated with the at least one office entity corresponding to the event; and
    processing the call to implement the call features in the sequence defined in the office feature queue for the call.

2. The method of claim 1 further comprising modifying the office feature queue.

3. The method of claim 1 further comprising creating office feature queues for each office entity.

4. The method of claim 1 further comprising creating group feature queues for each group entity.

5. The method of claim 1 further comprising creating subscriber feature queues for each subscriber entity.

6. A system for facilitating customized call processing comprising:
    an interface to receive triggers for a call processing events occurring during calls; and
    a control system associated with the interface and adapted to:
        define a plurality of entities, each of said plurality of entities selected from the list consisting of: an office, a group, or a subscriber;
        create an office feature queue for at least one office entity, wherein the office feature queue defines a sequence of call features and an associated event for call processing;
        define a sequence with which to implement call features for the office feature queue;
        create a group feature queue for at least one group entity associated with the at least one office entity, wherein the group feature queue is based on an inherited corresponding office feature queue;
        allow modification of the group feature queue to customize the group feature queue;
        create a subscriber feature queue for at least one subscriber entity associated with the at least one group entity, wherein the subscriber feature queue is based on an inherited corresponding group feature queue;
        allow modification of the subscriber feature queue to customize the subscriber feature queue;
        receive a trigger indicating an occurrence of the event for a call associated with the at least one office entity;
        identify the office feature queue associated with the at least one office entity corresponding to the event; and
        process the call to implement the call features in the sequence defined in the office feature queue for the call.

7. The system of claim 6, wherein the control system is further adapted to modify the office feature queue.

8. The system of claim 6, wherein the control system is further adapted to create office feature queues for each office entity.

9. The system of claim 6, wherein the control system is further adapted to create group feature queues for each group entity.

10. The system of claim 6, wherein the control system is further adapted to create subscriber feature queues for each subscriber entity.

11. A system for facilitating customized call processing comprising:
    means for defining a plurality of entities, each of said plurality of entities selected from the list consisting of: an office, a group, or a subscriber;
    means for creating an office feature queue for at least one office entity, wherein the office feature queue defines a sequence of call features and an associated event for call processing;
    means for defining a sequence with which to implement call features for the office feature queue;
    means for creating a group feature queue for at least one group entity associated with the at least one office entity, wherein the group feature queue is based on an inherited corresponding office feature queue;
    means for allowing modification of the group feature queue to customize the group feature queue;
    means for creating a subscriber feature queue for at least one subscriber entity associated with the at least one group entity, wherein the subscriber feature queue is based on an inherited corresponding group feature queue;
    means for allowing modification of the subscriber feature queue to customize the subscriber feature queue;
    means for receiving a trigger indicating an occurrence of the event for a call associated with the at least one office entity;
    means for identifying the office feature queue associated with the at least one office entity corresponding to the event; and means for processing the call to implement the call features in the sequence defined in the office feature queue for the call.

12. The system of claim 11 further comprising means for modifying the office feature queue.

13. The method of claim 11 further comprising means for creating office feature queues for each office entity.

14. The method of claim 11 further comprising means for creating group feature queues for each group entity.

15. The method of claim 11 further comprising means for creating subscriber feature queues for each subscriber entity.

16. A computer readable medium comprising software instructions for a computer to facilitate customized call processing by:
   defining a plurality of entities, each of said plurality of entities selected from the list consisting of: an office, a group, or a subscriber;
   creating an office feature queue for at least one office entity, wherein the office feature queue defines a sequence of call features and an associated event for call processing;
   defining a sequence with which to implement call features for the office feature queue;
   creating a group feature queue for at least one group entity associated with the at least one office entity, wherein the group feature queue is based on an inherited corresponding office feature queue;
   allowing modification of the group feature queue to customize the group feature queue;
   creating a subscriber feature queue for at least one subscriber entity associated with the at least one group entity, wherein the subscriber feature queue is based on an inherited corresponding group feature queue;
   allowing modification of the subscriber feature queue to customize the subscriber feature queue;
   receiving a trigger indicating an occurrence of the event for a call associated with the at least one office entity;
   identifying the office feature queue associated with the at least one office entity corresponding to the event; and
   processing the call to implement the call features in the sequence defined in the office feature queue for the call.

17. The computer readable medium of claim 16 wherein the software instructions further comprise instructions for modifying the office feature queue.

18. The computer readable medium of claim 16 wherein the software instructions further comprise instructions for creating office feature queues for each office entity.

19. The computer readable medium of claim 16 wherein the software instructions further comprise instructions for creating group feature queues for each group entity.

20. The computer readable medium of claim 16 wherein the software instructions further comprise instructions for creating subscriber feature queues for each subscriber entity.

* * * * *